(12) United States Patent
Kim

(10) Patent No.: US 9,830,754 B2
(45) Date of Patent: Nov. 28, 2017

(54) CONTROL SYSTEM AND METHOD FOR OPENING TAIL GATE

(71) Applicant: Hyundai Motor Company, Seoul (KR)

(72) Inventor: Jong Gyu Kim, Incheon (KR)

(73) Assignee: HYUNDAI MOTOR COMPANY, Seoul (KR)

(\*) Notice: Subject to any disclaimer, the term of this patent is extended or adjusted under 35 U.S.C. 154(b) by 8 days.

(21) Appl. No.: 14/923,013

(22) Filed: Oct. 26, 2015

(65) Prior Publication Data

US 2016/0121849 A1  May 5, 2016

(30) Foreign Application Priority Data

Nov. 4, 2014  (KR) .................. 10-2014-0152068

(51) Int. Cl.
*B60R 25/24* (2013.01)
*G07C 9/00* (2006.01)

(52) U.S. Cl.
CPC .......... *G07C 9/00007* (2013.01); *B60R 25/24* (2013.01); *G07C 2209/08* (2013.01); *G07C 2209/63* (2013.01)

(58) Field of Classification Search
CPC combination set(s) only.
See application file for complete search history.

(56) References Cited

U.S. PATENT DOCUMENTS

| | | | |
|---|---|---|---|
| 2014/0009264 A1* | 1/2014 | Song | G08C 19/00 340/5.64 |
| 2014/0156112 A1* | 6/2014 | Lee | G08C 17/00 701/2 |

FOREIGN PATENT DOCUMENTS

| | | |
|---|---|---|
| JP | 2012-193580 A | 10/2012 |
| KR | 10-0882676 B1 | 2/2009 |
| KR | 10-0941108 B1 | 2/2010 |
| KR | 10-0957103 B1 | 5/2010 |
| KR | 10-1209680 B1 | 12/2012 |
| KR | 10-2014-0019767 A | 2/2014 |
| WO | 2012/108440 A1 | 8/2012 |

\* cited by examiner

*Primary Examiner* — Edward J Pipala
(74) *Attorney, Agent, or Firm* — McDermott Will & Emery LLP

(57) ABSTRACT

A control method for opening a tail gate for a vehicle capable of performing an auto opening operation of the tail gate includes steps of primarily sensing an intention of a user carrying a smart key to open the tail gate and then performing secondary sensing to confirm whether a distance between the smart key and the tail gate is equal to or more than a predetermined distance. Thus, any damage or interference of the tail gate may be prevented.

19 Claims, 6 Drawing Sheets

CONTROL SYSTEM AND METHOD FOR OPENING TAIL GATE

CROSS-REFERENCE TO RELATED APPLICATION

This application claims under 35 U.S.C. §119(a) the benefit of Korean Patent Application No. 10-2014-0152068 filed on Nov. 4, 2014, the entire contents of which are incorporated herein by reference.

TECHNICAL FIELD

The present disclosure relates to a control system and method for opening a tail gate for a vehicle. More particularly, it relates to a control system and method for opening a tail gate for a vehicle capable of primarily confirming a user's intention to open a tail gate and then performing an auto opening operation of the tail gate only when a distance from a user is equal to or more than a predetermined distance.

BACKGROUND

Generally, a tail gate is mounted at a rear portion of a sports utility vehicle, a recreational vehicle, a hatch-back type vehicle, a van, and the like so as to provide a wide and open loading space.

Recently, a tail gate capable to be automatically opened has been equipped in a vehicle so that when a user carrying a smart key approaches the tail gate up to a predetermined distance, the tail gate will be automatically opened.

Referring to FIG. 1, if the user uses the tail gate function, a process of sensing that the user carrying the smart key approaches the tail gate up to a predetermined distance to issue an alarm (sound+lamp), a process of performing an authentication procedure between the smart key and a smart key controller installed in the vehicle, and a process of issuing, by the smart key controller, an open instruction to the tail gate are performed, and thus the tail gate is automatically opened together with an open alarm (sound+lamp).

In this case, a sensing distance between the user carrying the smart key and the tail gate is fixed to about 1.0 m.

However, the existing tail gate system has the following problems.

First, when the user approaches the tail gate in a state in which he/she does not intend to open the tail gate, automatically opening the tail gate may occur while an alarm process of turning on an alarm sound and an alarm illumination is performed.

Second, since the sensing distance between the user carrying the smart key and the tail gate is fixed to about 1.0 m, when the user carries a load, the tail gate may collide with the load at when the tail gate is automatically opened.

Third, as illustrated in the accompanying FIG. 2, if a vehicle is parked in a garage, when the user carrying the smart key is located, having a garage door disposed therebetween, that is, when the user is located at a distance of about 1 m from the tail gate, having the garage door disposed therebetween, automatically opening the tail gate may occur while the alarm process of unexpectedly turning on the alarm sound and the alarm illumination is performed. Thus, the tail gate may be damaged due to a collision with the shutter while the tail gate is automatically opened.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art and to provide a control system and method for opening a tail gate for a vehicle capable of performing an auto opening operation of the tail gate, by primarily sensing an intention of a user carrying a smart key to open the tail gate and then performing secondary sensing of confirming whether a distance between the smart key and the tail gate is equal to or more than a predetermined distance for preventing a damage and an interference of the tail gate.

In one aspect, the present invention provides a control system for opening a tail gate for a vehicle, including: a distance sensing unit configured to primarily sense a smart key within a first distance from a tail gate and secondarily sense the smart key within a second distance from the tail gate, the first distance being less than the second distance; an authentication receiving unit configured to receive authentication data of the smart key for opening the tail gate; and a control unit configured to instruct an auto opening to the tail gate by determining that the primary sensing and the secondary sensing results by the distance sensing unit meet a predetermined pattern and confirming the authentication data by the authentication receiving unit.

In another aspect, the present invention provides a control method for opening a tail gate for a vehicle, including: primarily sensing a first distance between a smart key of a user and a tail gate; secondarily sensing a second distance between the smart key and the tail gate, the second distance being greater than the first distance; authenticating the smart key; and performing a control to automatically open the tail gate after the secondary sensing ends and then the authentication of the smart key ends.

In a preferred embodiment, the first distance may be a distance to confirm a user's intention to open the tail gate and be set to be equal to or less than a first predetermined distance and the second distance may be a distance to prevent a damage and an interference of the tail gate at the time of opening the tail gate and be set to be equal to or less than a second predetermined distance.

In another aspect, the present invention provides a control method for opening a tail gate for a vehicle, including: upon detecting that a smart key is at or within a predetermined first distance from the tail gate, periodically checking whether the smart key being at or within the first predetermined distance from the tail gate during a first predetermined period; upon determining that the smart key being at or within the first predetermined distance from the tail gate satisfies a first predetermined pattern, periodically checking whether the smart key being at a distance greater than the first predetermined distance from the tail gate and equal to or less than a second predetermined distance from the tail gates during a second predetermined period; and upon determining that the smart key being at the distance greater than the first predetermined distance from the tail gate and equal to or less than the second predetermined distance from the tail gates satisfies a second predetermined pattern, automatically opening the tail gate.

Other features of the present invention are as described in a detailed description of the present invention and sub-claims of claims.

By the above configuration, the present invention has the following effects.

First, it is possible to accurately understand the user's intention to open the tail gate, by primarily sensing the intention of the user carrying the smart key to open the tail gate and performing the distance sensing for the smart key within a shorter distance (for example, 50 cm) than 1.0 m in a one-step manner.

It is possible to prevent the tail gate from being automatically opened when the smart key approaches the tail gate up to about 1 m in the state in which the user does not intend to open the tail gate, by understanding the intention to open the tail gate by the primary sensing.

Second, it is possible to prevent the load of the user and the tail gate from interfering with each other and the tail gate from being damaged due to the collision with the surroundings, by primarily sensing the user's intention to open the tail gate, performing the secondary sensing of confirming whether the distance between the smart key and the tail gate is the predetermined distance (for example, 1.0 m) for preventing the damage and interference of the tail gate, and then opening the tail gate.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
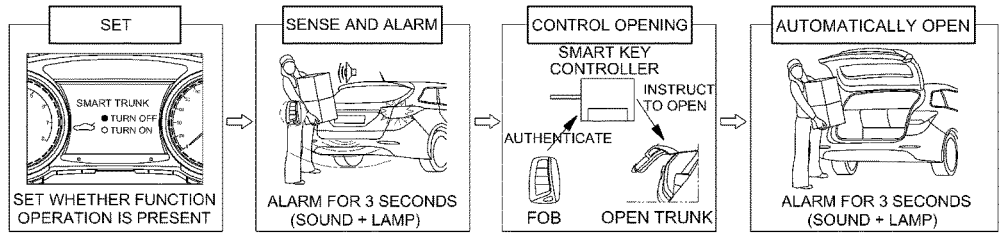
FIG. 1 is a schematic diagram for describing an auto opening process of a tail gate according to the related art.
Figure 2:
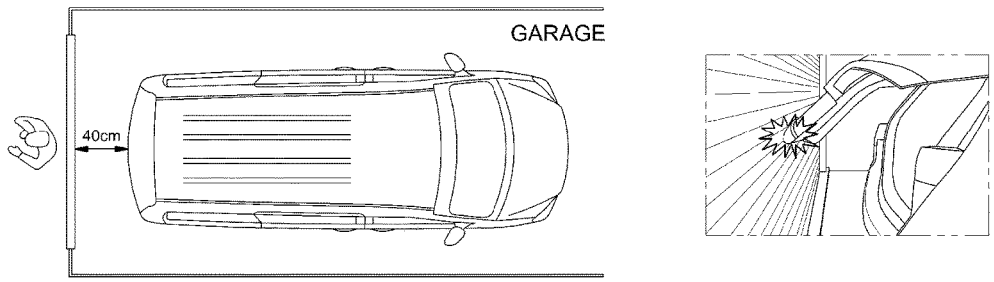
FIG. 2 is a schematic diagram illustrating a problem which occurs when the tail gate is automatically opened, according to the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The present invention is to provide a control system and method for opening a tail gate capable of automatically opening the tail gate, by primarily confirming a user's intention to open the tail gate by sensing a first distance (for example, about 50 cm) between a smart key of the user and the tail gate and then sensing a second distance (for example, about 1.0 m) between the smart key and the tail gate, that is, a distance to prevent interference and damage of the tail gate at the time of opening the tail gate.

Figure 3:
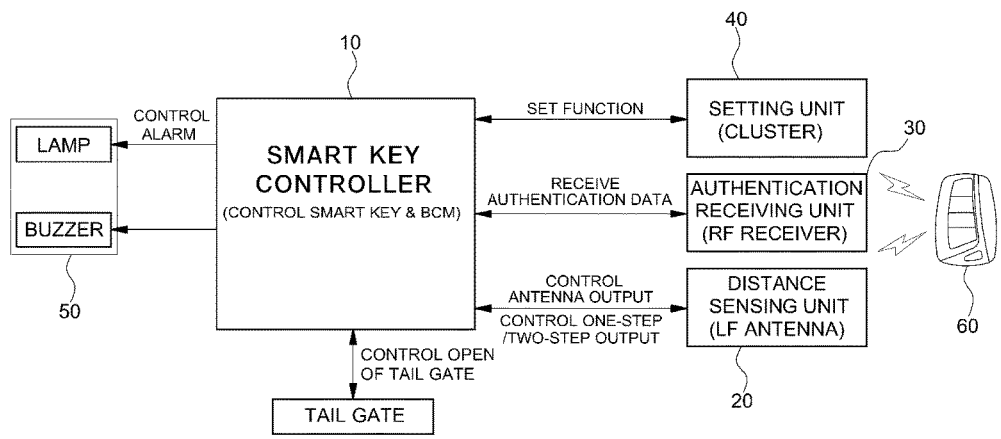
FIG. 3 is a configuration diagram of hardware illustrating a control system for opening a tail gate for a vehicle according to an exemplary embodiment of the present invention.

To this end, a hardware configuration for a control system for opening a tail gate according to an exemplary embodiment of the present invention is illustrated in FIG. 3.

In FIG. 3, reference numeral 10 is a smart key controller which is equipped in a vehicle.

A low frequency (LF) antenna, a distance sensing unit 20, may be mounted at an adjacent position to the tail gate of the vehicle. The distance sensing unit 20 may primarily sense a first distance (for example, about 50 cm) or less which is a short distance between a smart key 60 of a user and the tail gate and may secondarily sensing a second distance (for example, about 1.0 m) or less which is a remote distance and is greater than the first distance between the smart key 60 and the tail gate. In other words, the sensing unit 20 may be able to determine whether the smart key 60 is located at or within the first distance from the tail gate, or is located at or within the second distance from the tail gate but out of the first distance from the tail gate.

Preferably, the distance sensing unit 20 sets the first distance for primarily confirming a user's intention to open the tail gate to be equal to or less than a first predetermined distance, for example, 50 cm, and sets the second distance for preventing the interference and the damage of the tail gate at the time of opening the tail gate to be equal to or less than a second predetermined distance but greater than the first predetermined distance, for example, 1.0 m, to perform the sensing.

A radio frequency (RF) receiver, which may be implemented as an authentication receiving unit 30 to receive authentication data of the smart key 60 for automatically opening the tail gate, may be equipped in the vehicle.

Meanwhile, it is possible to enable an auto opening function of the tail gate or disable the auto opening function by a menu displayed through a cluster 400 in the vehicle.

In this case, the smart key controller 10 determines that the process of primarily sensing the first distance and the process of secondarily sensing the second distance which are performed by the distance sensing unit 20 are normally completed, and at the same time, confirms the authentication data of the authentication receiving unit 30 by communication with the smart key 60, thereby controlling the auto opening of the tail gate. The normal completion of the process of primary sensing prefers to: after the distance sensing unit 20 first senses or identifies that the smart key 60 is positioned at the first distance from the tail gate, the distance sensing unit 20 continues to sense and determine that at a predetermined interval during a first predetermined period, the smart key 60 being positioned at or within the first distance from the tail gate satisfies a first predetermined pattern. The normal completion of the process of secondary sensing prefers to: upon the normal completion of the process of the primary sensing, the distance sensing unit 20 senses and determines, at the predetermined interval within a second predetermined period since the normal completion of the process of the primary sensing, that the smart key 60 being positioned between the first distance and second distance from the tail gate meets a second predetermined pattern.

Since an electrical signal may be exchanged between an output unit of the smart key controller 10 and an alarm unit 50, the alarm unit 50 serves to alert the user by turning on different alarm illumination patterns while producing different alarm sounds during the primary sensing and the secondary sensing performed by the distance sensing unit 20.

Here, a control method for opening a tail gate according to the exemplary embodiment of the present invention configured by a hardware control as described above will be described below.

First, to determine whether the user has an intention to open the tail gate, the primary sensing step is performed to sense or determine whether the smart key carried by the user is at or within the first distance from the tail gate.

In other words, when the user approaches the tail gate, carrying the smart key, the primary sensing step for determining whether the user has an intention to open the tail gate or does not have an intention to open the tail gate only when temporarily staying at the tail gate side is sensed by in the primary sensing step performed by the distance sensing unit 20.

In this case, the first distance is a distance to primarily confirm the user's intention to open the tail gate and is set to be equal to or less than, for example, 50 cm.

Figure 4:
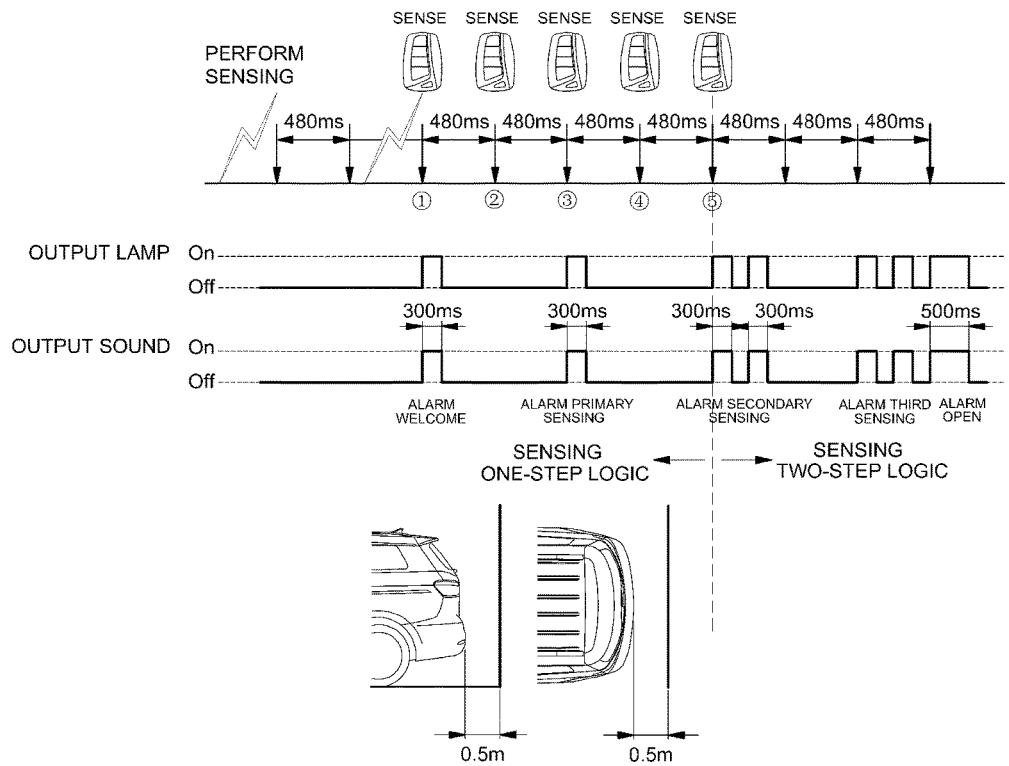
FIGS. 4 to 6 are control diagrams of a process of sensing a first distance, among control processes for opening a tail gate for a vehicle according to an exemplary embodiment of the present invention.

Referring to the accompanying FIG. 4, in the primary sensing step, after the distance sensing unit 20 first senses (or determine) once the first distance which is the short distance between the smart key and the tail gate, the control method proceeds to further sensing the first distance a predetermined number of times, for example, five times, at a predetermined time interval, for example, 480 ms.

When the first distance is first sensed once and then the sensing of the first distance is normally performed, for example, five times, the primary sensing condition is satisfied, and thus the primary sensing ends.

Figure 5:
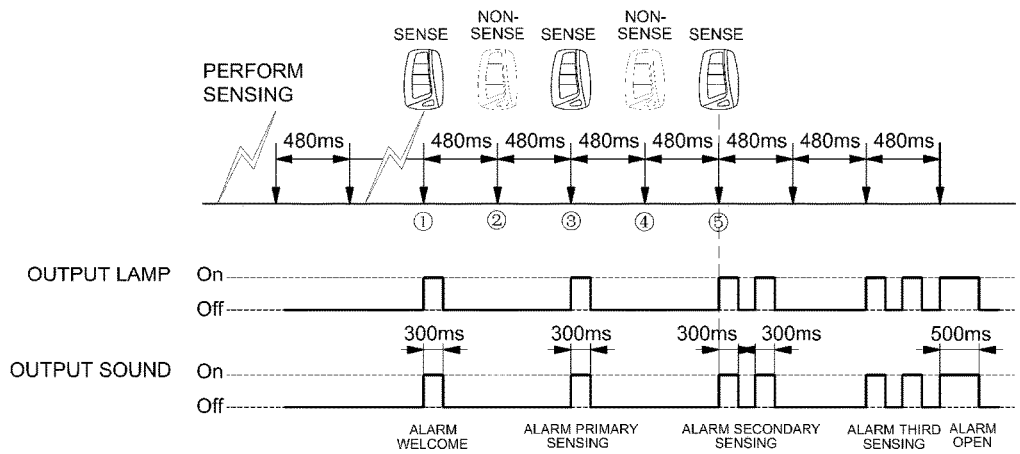

Referring to the accompanying FIG. 5, during the first sensing, even when the first distance is normally sensed alternately, for example, three times or more, while sensing whether the smart key 60 exists within the first distance is further performed, for example, five times, after the first distance is first sensed once, it is determined that the user carrying the smart key is within the first distance from the tail gate and thus the first sensing ends.

As such, when the first distance is first sensed once and then the sequential five times sensing of the first distance is normally performed or the sensing of the first distance is normally performed three times or more, the user carrying the smart key maintains the first distance and keeps staying at the tail gate side and therefore it may be determined that the user has an intention to open the tail gate.

In this case, when the first distance is first sensed once, the user performs a welcome alarm (sound+lamp turning on) process and when the primary sensing ending is satisfied, an alarm (sound+lamp turning on) having an interval shorter than that of the welcome alarm is performed once, and as a result, the distance sensing for the user to open the tail gate is normally performed and the user may audibly and visually recognize that the tail gate is opened soon.

Figure 6:
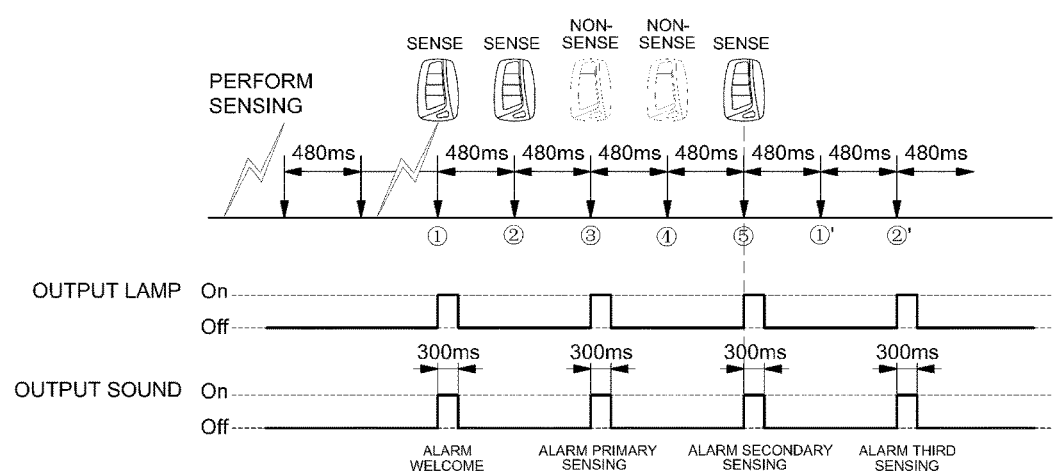

Referring to the accompanying FIG. 6, in the first sensing, after the first distance is first sensed once, if the existence of the smart key 60 within the first distance is not sensed (or identified) continuously twice while sensing whether the smart key 60 exists within the first distance is further performed five times, the primary sensing ending condition is not satisfied and thus sensing whether the smart key 60 exists within the first distance is reperformed.

That is, when in the primary sensing, when the first distance is first sensed once and then the first distance is not sensed continuously twice while sensing whether the smart key 60 exists within the first distance is further performed five times, it is determined that the user carrying the smart key is out of the first distance or more from the tail gate and thus it is determined that the user does not have an intention to open the tail gate. The primary sensing ending condition of the first distance is not satisfied and thus the sensing of the first distance is reperformed.

As such, it is possible to accurately understand the user's intention to open the tail gate, by primarily sensing the intention of the user carrying the smart key to open the tail gate by sensing the first distance and performing the distance sensing for the smart key within a shorter distance (for example, 50 cm) than 1.0 m.

Next, when the primary sensing normally ends, the secondary sensing to sense the second distance which is a remote distance between the smart key and the tail gate is progressed.

The second distance which is a distance to prevent the damage and the interference of the tail gate at the time of opening the tail gate is set to be equal to or less than, for example, 1.0 m and is set to be greater than the first distance.

Figure 7:
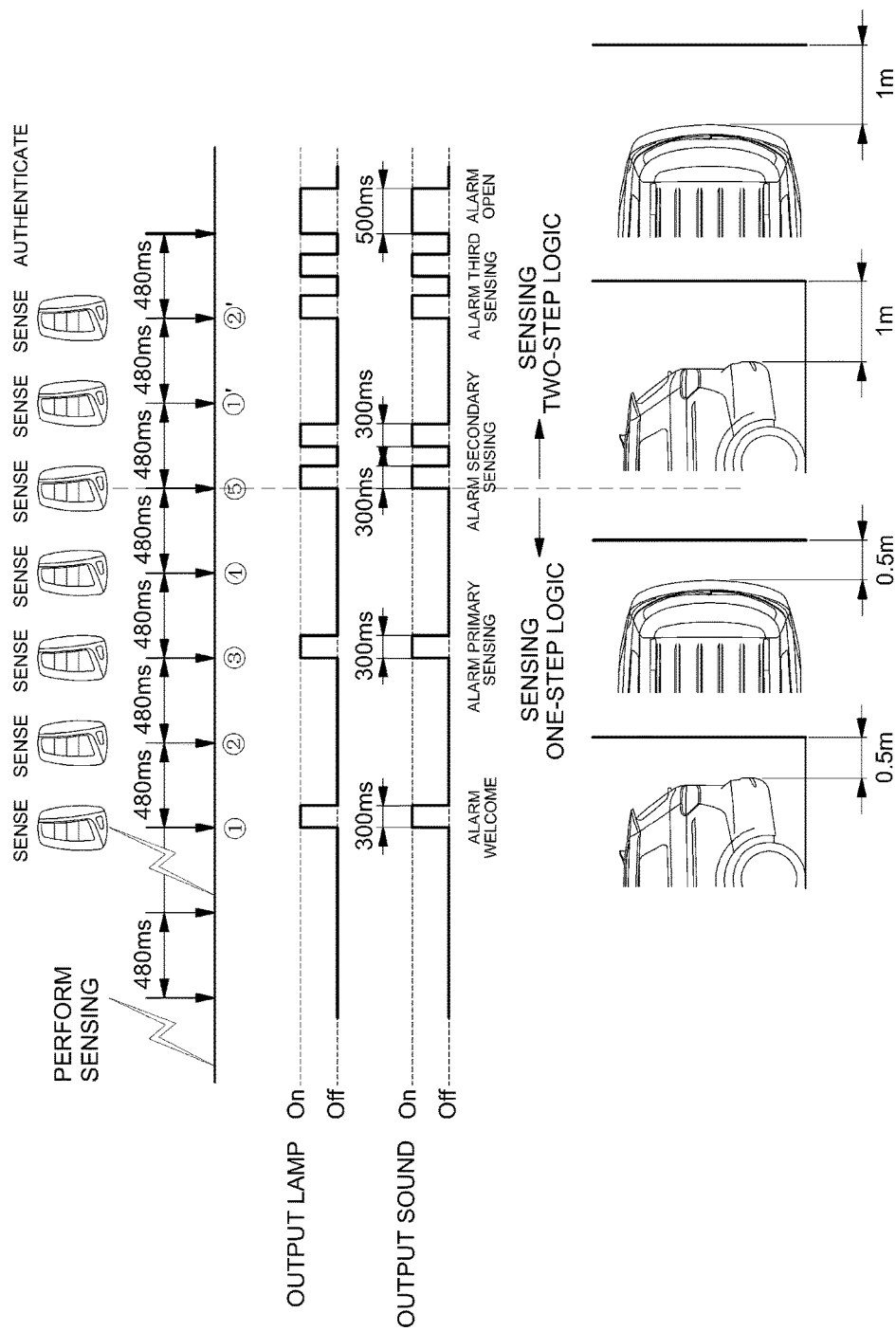
FIGS. 7 to 9 are control diagrams of a process of sensing a second distance, among the control processes for opening a tail gate for a vehicle according to the exemplary embodiment of the present invention.

Referring to the accompanying FIG. 7, the secondary sensing is progressed to sensing the second distance which is the remote distance between the smart key and the tail gate continuously twice after the primary sensing normally ends.

When the primary sensing normally ends and then the sensing of the second distance which is the remote distance between the smart key and the tail gate continuously twice is normally performed, the secondary sensing condition is satisfied and thus the secondary sensing ends.

Figure 8:
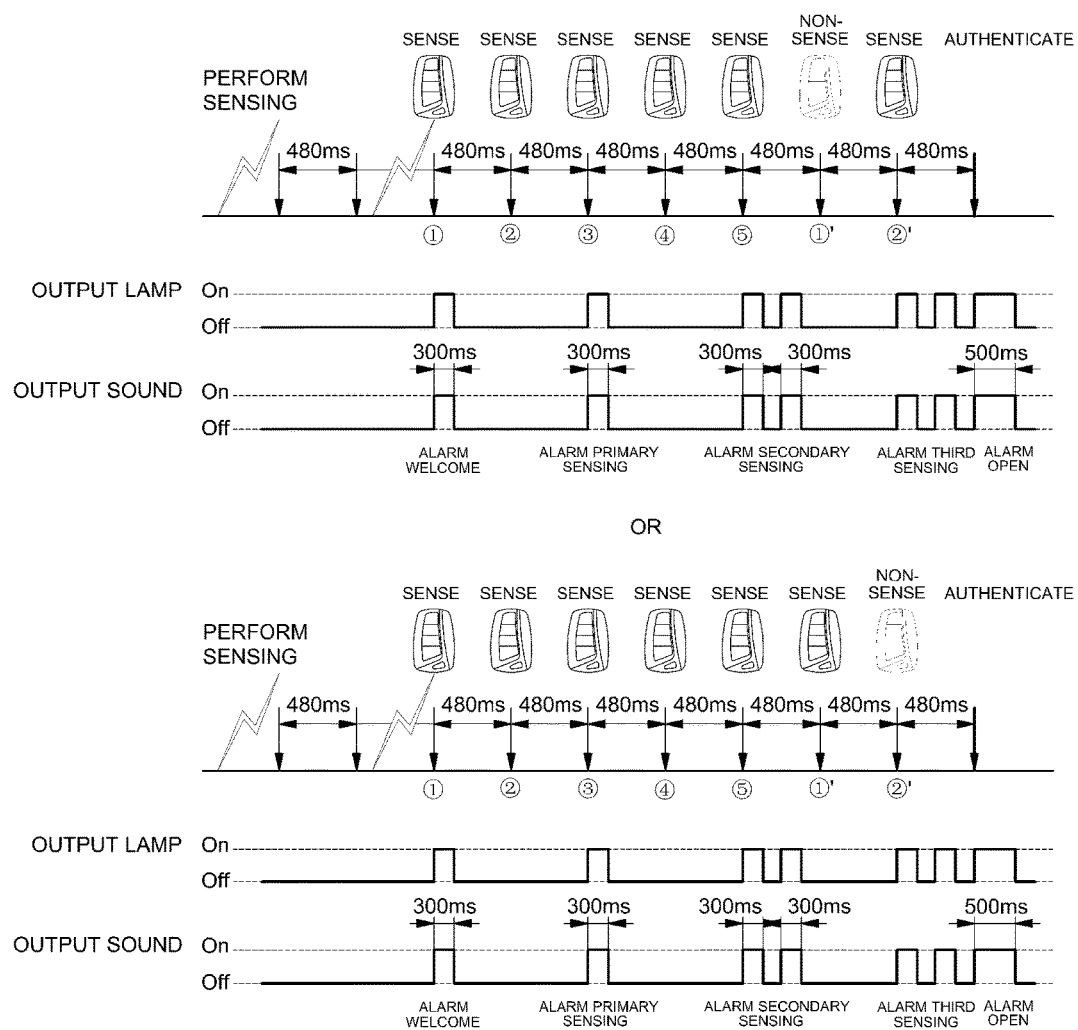
Figure 9:
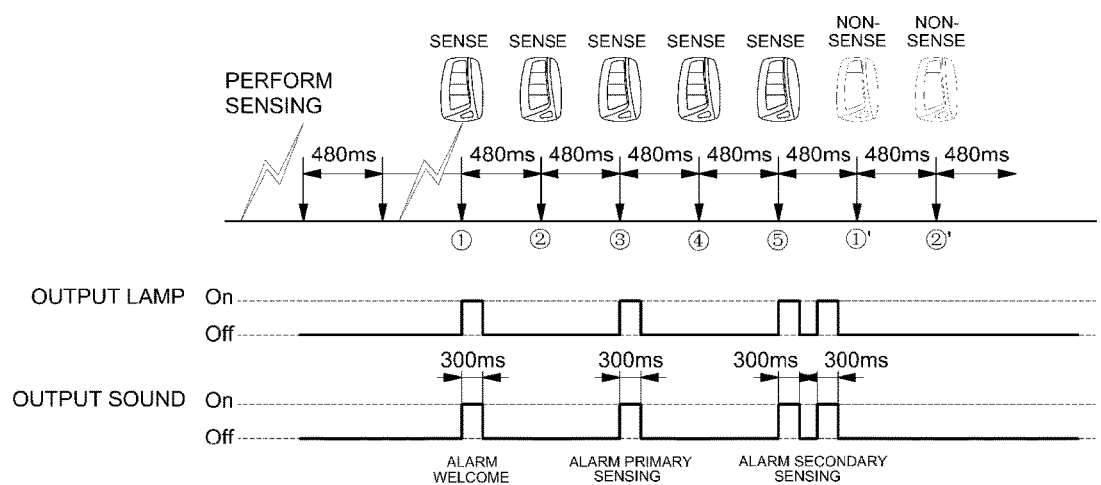

Referring to the accompanying FIG. 8, in the secondary sensing, even when the second distance is sensed once or more while the second distance which is the remote distance between the smart key and the tail gate is sensed continuously twice, the secondary sensing condition is satisfied and thus the secondary sensing ends.

On the other hand, when the second distance which is the remote distance between the smart key and the tail gate is not sensed continuously twice in the secondary sensing, the secondary sensing ending condition is not satisfied and thus the sensing of the first distance is again performed.

That is, when the second distance which is the remote distance between the smart key and the tail gate is not sensed continuously twice, it is determined that the user carrying the smart key is out of the second distance or more from the tail gate, and thus it is determined that there is no intention to open the tail gate, such that the sensing of the first distance is again performed.

Meanwhile, the twice alarm (sound+lamp turning on) having an interval shorter than that of the welcome alarm is performed when the secondary sensing starts and when the secondary sensing normally ends, the twice alarm (sound+lamp turning on) having the interval shorter than that of the welcome alarm is further performed, such that the user may audibly and visually recognize that the tail gate is opened soon.

Next, when the secondary sensing normally ends, the smart key controller 10 confirms the authentication data of the authentication receiving unit 30 by the communication with the smart key 60 and then a control to automatically open the tail gate is performed.

In this case, when the smart authentication on the authentication data transmitted from the smart key 60 ends, an alarm (sound+lamp turning on) lasting a period longer than that of the welcome alarm as an alarm for the opening of the tail gate is performed once and thus the user may recognize that the tail gate is opened.

As such, it is possible to easily prevent the load of the user and the tail gate from interfering with each other and the tail gate from being damaged due to the collision with the surroundings, by performing the primary sensing to understand the user's intention to open the tail gate, performing the secondary sensing of confirming whether the second distance between the smart key and the tail gate is the predetermined distance (for example, 1.0 m) for preventing the damage and interference of the tail gate, and then automatically opening the tail gate.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A control system for opening a tail gate for a vehicle, comprising:
    a distance sensing unit configured to primarily sense a smart key of a user within a first distance from a tail gate and to secondarily sense the smart key within a second distance from the tail gate, the first distance being less than the second distance;
    an authentication receiving unit configured to receive authentication data of the smart key for opening the tail gate; and
    a controller configured to instruct the tail gate to be automatically opened by determining that the primary sensing and the secondary sensing results by the distance sensing unit meet a predetermined pattern and confirming the authentication data by the authentication receiving unit,
    wherein the distance sensing unit is adopted as a low frequency (LF) antenna which communicates with the smart key to confirm a user's intention to open the tail gate.

2. The control system of claim 1, wherein the first distance is equal to or less than a first predetermined distance and the second distance is equal to or less than a second predetermined distance.

3. The control system of claim 1, wherein the authentication receiving unit is adopted as an RF receiver which communicates with a smart key.

4. The control system of claim 1, further comprising:
    an alarm unit configured to produce different alarm sounds and alarm illumination patterns at the time of the primary sensing and the secondary sensing.

5. A control method for opening a tail gate for a vehicle, comprising:
    primarily sensing, by a distance sensing unit, a first distance between a smart key of a user and a tail gate, wherein the distance sensing unit is adopted as a low frequency (LF) antenna which communicates with the smart key to confirm a user's intention to open the tail gate;
    secondarily sensing, by the distance sensing unit, a second distance between the smart key and the tail gate, the second distance being greater than the first distance;
    authenticating, by an authentication receiving unit, the smart key; and
    performing, by a controller, a control to automatically open the tail gate after the secondary sensing ends and then the authentication of the smart key ends,
    wherein the first distance is a distance to confirm a user's intention to open the tail gate, the second distance is a distance to prevent a damage and an interference of the tail gate at the time of opening the tail gate.

6. The control method of claim 5, wherein the first distance is a distance to confirm a user's intention to open the tail gate and is equal to or less than a first predetermined distance and the second distance is a distance to prevent a damage and an interference of the tail gate at the time of opening the tail gate and is equal to or less than a second predetermined distance.

7. The control method of claim 5, wherein when in the primary sensing, the first distance is first sensed once and then is further sensed a first predetermined number of times during a predetermined period, the ending of the primary sensing is satisfied.

8. The control method of claim 7, further comprising:
    when the first distance is first sensed once, outputting a welcome alarm; and
    when the ending of the primary sensing is satisfied, further outputting an alarm having a period shorter than the welcome alarm.

9. The control method of claim 5, wherein when in the primary sensing, the first distance is first sensed once and then is sensed three times or more while the first distance is further sensed the first predetermined number of times, the ending of the primary sensing is satisfied.

10. The control method of claim 5, wherein when in the primary sensing, the first distance is first sensed once and then is not sensed continuously twice while the first distance is further sensed the first predetermined number of times, a primary sensing ending condition is not satisfied and thus the sensing of the first distance is reperformed.

11. The control method of claim 5, wherein the secondary sensing is performed when the primary sensing results meet a predetermined pattern.

12. The control method of claim 5, wherein when in the secondary sensing, the second distance which is a remote distance between the smart key and the tail gate is sensed continuously twice during a second predetermined period, the ending of the secondary sensing is satisfied.

13. The control method of claim 12, wherein a twice alarm having a short period is performed when the secondary sensing starts and the twice alarm having the short period is further performed when the secondary sensing ends.

14. The control method of claim 5, wherein when in the secondary sensing, the second distance which is the remote distance between the smart key and the tail gate is sensed once or more while the second distance is sensed continuously twice, the ending of the secondary sensing is satisfied.

15. The control method of claim 5, wherein when in the secondary sensing, the second distance which is the remote distance between the smart key and the tail gate is not sensed continuously twice, the secondary sensing ending condition is not satisfied and thus the sensing of the first distance is again performed.

16. The control method of claim 5, wherein after the secondary sensing ends and the authentication of the smart key ends, an alarm having a long period as an alarm for the opening of the tail gate is performed once.

17. A method for opening a tail gate for a vehicle, comprising:
upon detecting, by a distance sensing unit, that a smart key is at or within a predetermined first distance from the tail gate periodically checking whether the smart key is at or within the first predetermined distance from the tail gate during a first predetermined period,
wherein the distance sensing unit is adopted as a low frequency (LF) antenna which communicates with the smart key to confirm a user's intention to open the tail gate;
upon determining that the smart key being at or within the first predetermined distance from the tail gate satisfies a first predetermined pattern, periodically checking whether the smart key being at a distance greater than the first predetermined distance from the tail gate and equal to or less than a second predetermined distance from the tail gates during a second predetermined period; and
upon determining that the smart key being at the distance greater than the first predetermined distance from the tail gate and equal to or less than the second predetermined distance from the tail gates satisfies a second predetermined pattern, automatically opening the tail gate,
wherein the first distance is a distance to confirm a user's intention to open the tail gate, the second distance is a distance to prevent a damage and an interference of the tail gate at the time of opening the tail gate.

18. The method of claim 17, further comprising authenticating the smart key.

19. The method of claim 17, further comprising outputting different alarms during the first predetermined period and during the second predetermined period.

* * * * *